United States Patent Office 3,514,480
Patented May 26, 1970

3,514,480
PROCESS FOR PRODUCING SULFUR CONTAINING AROMATIC CARBOXYLIC ACIDS
Ellis K. Fields, Chicago, Ill., assignor to Standard Oil Company, Chicago, Ill., a corporation of Indiana
No Drawing. Filed Jan. 19, 1967, Ser. No. 610,228
Int. Cl. C07c 149/30, 161/00
U.S. Cl. 260—516
10 Claims

ABSTRACT OF THE DISCLOSURE

Novel sulfur-containing compounds are produced when aromatic carboxylic acids are sulfurized by reacting them with sulfur and sulfuric acid at elevated temperatures. The resulting products are useful as pesticides and as extreme pressure lubricating oil additives.

---

This invention relates to the sulfurization of aromatic acids with sulfur and sulfuric acids. According to my process, novel and stable sulfur-containing products useful as pesticides and as lube additives are produced. The products produced by my novel process are useful as extreme pressure additives in lubricating oils.

The process of my invention consists of reacting substituted or unsubstituted aromatic carboxylic acids with sulfur and sulfuric acids at elevated temperatures. More particularly, the process of my invention consists of reacting aromatic carboxylic acids with sulfur and sulfuric acids in the ratio of 1 mole aromatic carboxylic acid: 1 gram atom sulfur: 1 mole sulfuric acid to 1 mole aromatic carboxylic acid: 20 grams atom sulfur: 50 mole sulfuric acid at an elevated temperature of 100–200° C. for about ²⁄₁₀ to 24 hours. The aromatic carboxylic acids sulfurized by the novel process include aromatic carboxylic acids that may contain alkyl or halogen substituents. Examples of such aromatic carboxylic acids are benzoic acid; chloro-, bromo, and fluorobenzoic acids; difluoro-, dichloro-, and dibromobenzoic acids; toluic acids, naphthoic acids and the like. The mechanism of the sulfurization in my process probably involves an electrophilic attack on sulfur or by a protonated sulfur on the aromatic ring.

Under the preferred reaction conditions the carboxylic acid is reacted with sulfur and sulfuric acid in the mole ratio of 1 mole aromatic carboxylic acid: 2 grams atom sulfur: 4 mole sulfuric acid to 1 mole aromatic carboxylic acid: 4 gram atom sulfur: 10 mole sulfuric acid at a temperature of 130–185° C. for ½ hour to 4 hours. Sulfuric acid of 85 to 120% may be used, although concentrated sulfuric acid is preferable.

The following new sulfur-containing aromatic compounds were prepared, dicarboxyphenyl sulfide, dimethyl ester of dicarboxyphenyl sulfide, amine salts of dicarboxyphenyl sulfide, 4-chlorobenzoic acid-3-thiol, methyl ester of 4-chlorobenzoic acid-3-methyl thioether, 2,2'-dichloro-5,5'-dicarboxyphenyl sulfide, dimethyl ester of 2,2'-dichloro-5,5'-dicarboxyphenyl sulfide, amine salts of 4-chlorobenzoic acid-3-thiol, amine salts of 2,2'-dichloro-5,5'-dicarboxyphenyl sulfide.

The new compounds have the following generic formulas:

The substituted phenyl sulfide derivatives have the formula;

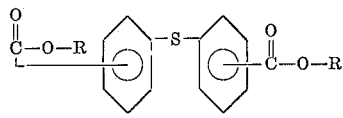

wherein R is selected from the group consisting of hydrogen, methyl, and aliphatic or aromatic amines; and

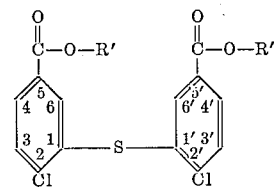

wherein R' is selected from the group consisting of hydrogen, methyl and aliphatic or aromatic amines.

Chlorobenzoic acid methyl ester derivatives of 3-thiol of the formula:

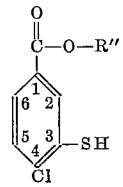

wherein R" is selected from the group consisting of hydrogen and methyl and aliphatic or aromatic amines.

The aliphatic and aromatic amines which react with dicarboxyphenyl sulfide 4-chlorobenzoic acid-3-thiol and 2,2'-dichloro-5,5' - dicarboxyphenyl sulfide for their respective amino salts include the following aliphatic and aromatic amines.

Aliphatic: methylamine, dimethylamine, trimethylamine, ethylamine, diethylamine, triethylamine, n-propylamine, tri-n-propylamine, n-butylamine, n - amylamine, n-hexylamine, laurylamine;

Aromatic amines: aniline, methylaniline, dimethylaniline, diethylaniline, o-toluidine, m-toluidine, p-toluidine, o-nitroaniline, m-nitroaniline, p-nitroaniline, 2,4-dinitroanaline, o-phenylenediamine, m-phenylenediamine, p-phenylenediamine, o-anisidine, diphenylamine, triphenylamine, benzidine, o-tolidine, o-dianisidine.

The products of my invention are useful as extreme pressure additives. The utility is shown in Example 14. In this example it is shown that the products prepared by my process are useful as extreme pressure additives in lubricating oils and are useful as pesticides and fungicides. The data show the effectiveness of the new aromatic carboxylic acids as pesticides and as additives in lubricating oils. For these uses the additives may be used in a concentration of 0.001 to 10% by weight.

EXAMPLE I

A mixture of 72.2 g. (0.6 mole) benzoic acid, 38.4 g. (1.2 gram atom) sulfur, and 200 ml. concentrated sulfuric acid was stirred at 145° C. for 7 hours. Evolution of sulfur dioxide was brisk at 145° C., but slowed down after 1 hour, though it still was evident at the end of 7 hours. The mixture was poured on crushed ice: the yellow-orange solid was collected on a filter and washed with water. It was then stirred with excess aqueous sodium bicarbonate solution at room temperature for 2 hours. The filtered bicarbonate solution was acidified with dilute hydrochloric acid and the precipitated acid was collected on a filter, washed and dried in a vacuum oven at 100° C. It weighed 58 g., softened at 180° C., melted with decomposition at 235–240° C.

*Analysis.*—C, 50.0; H, 2.2; S, 25.8; acid No. 247. The sulfurized product of Example I was esterified with methanol and submitted for mass spectroscopy. The major components were:

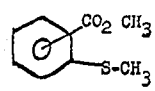 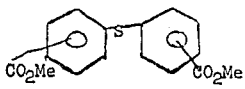

EXAMPLE II

To test the stability of the sulfur in the sulfurized acid of Example I, a solution of 10 g. in 100 ml. of 10% aqueous sodium hydroxide was refluxed for 130 minutes. The acid was precpitated with dilute hydrochloric acid, redissolved in bicarbonate solution, reprecipitated, filtered, washed and dried. It analyzed 26.5% and had an acid number of 238. The sulfur content has obviously been unaffected by the boiling in concentrated aqueous alkali.

EXAMPLE III

A mixture of 24.4 g. (0.2 mole) benzoic acid, 150 ml. concentrated sulfuric acid, and 19.2 g. (0.6 atom) sulfur was stirred at 140° C. for 24 hours. Workup as in Example I gave 28.3 g. (116 wt. percent based on benzoic acid) of reddish sulfurized benzoic acid analyzing 43.8% C, 2.3% H, 23.6% S, and 238 acid number.

EXAMPLE IV

To show that the acids of Examples 1 and 3 are formed by reaction of the combined reactants, a mixture of 10 g. of sulfur and 70 ml. concentrated sulfuric acid was stirred and heated. No sulfur dioxide was evolved after 2 hours at 200° C. and the sulfur was recovered quantitatively after treatment of the cooled mixture with ice. In a separate experiment a mixture of 12.2 g. (0.1 mole) benzoic acid and 50 ml. concentrated sulfuric acid was stirred at 140° C. for three hours. No sulfur dioxide evolved, and 93% of the benzoic acid was recovered by treatment with ice. Similarly, a mixture of benzoic acid and sulfur did not react after an hour at 145–160° C. Both benzoic acid and sulfur were recovered quantitatively.

EXAMPLE V

A mixture of 94. g. (0.6 mole) p-chlorobenzoic acid, 38.4 g. (1.2 gram atom) sulfur, and 200 ml. concentrated sulfuric acid was stirred at 165–175° C. for 6 hours, then worked up as in Example I. The product of 94.5 g. was heated in vacuo at 130° C. to sublime out 34 g. unreacted p-chlorobenzoic acid and recover 61 g. of sulfurized p-chlorobenzoic acid, an orange solid that analyzed 43.3% C, 2.5% H, 15.2% Cl, 21.0% S, and 294 acid number. The sulfurized product of Example I was esterified with methanol and submitted for mass spectroscopy. The major components were:

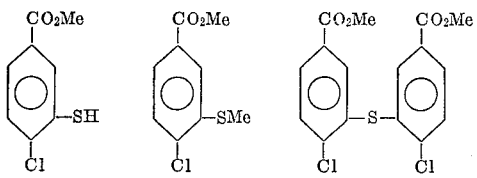

EXAMPLE VI

A mixture of 40.2 g. (0.2 mole) p-bromobenzoic acid, 100 ml. concentrated sulfuric acid, and 12.8 g. (0.4 gram atom) sulfur was stirred at 152–160° C. for 4 hours. Workup as in Example I and heating in a vacuum oven at 125° C. gave 6.0 g. unreacted p-bromobenzoic acid and 29.1 g. yellow sulfurized p-bromobenzoic acid that analyzed 33.8% C, 1.4% H, 32.8% Br, 16.4% S, and 206 acid number.

EXAMPLE VII

A mixture of 42 g. (0.3 mole) p-fluorobenzoic acid, 150 ml. concentrated sulfuric acid, and 19.2 g. (0.6 gram atom) sulfur was stirred at 158–175° C. for 5 hours. Workup as in Example I gave 29.4 orange-red sulfurized p-fluorobenzoic acid that softened at 195° C. and melted at 208–212° C., and analyzed 52.9% C, 2.2% H, 16.0% S and 308 acid number.

EXAMPLE VIII

A mixture of 98.4 g. (0.68 mole) m-chlorobenzoic acid, 300 ml. concentrated sulfuric acid and 38.4 g. (1.2 gram atom) sulfur was stirred at 158–170° C. for 7 hours. Workup as in Example I gave 73.1 g. of a mixture of original and sulfurized acid. The unreacted m-chlorobenzoic acid (56.8 g.) was removed by sublimation in vacuo, leaving 16.3 g. of sulfurized m-chlorobenzoic acid that analyzed 41.9% C, 2.9% H, 21.2% Cl, 11.2% S, and 207 acid number.

EXAMPLE IX

A mixture of 19.1 g. (0.1 mole) 2,4-dichlorobenzoic acid, 100 ml. concentrated sulfuric acid, and 12.8 g. (0.4 gram atom) sulfur was stirred at 170–185° C. for 6 hours. Workup as in Example I gave 5.7 g. dark sulfurized acid that analyzed 38.9% C, 1.9% H, 29.4% Cl, 13.8% S, and 200 acid number.

EXAMPLE X

A mixture of 13.6 g. (0.1 mole) p-toluic acid, 50 ml. concentrated sulfuric acid, and 12.8 g. (0.4 gram atom) sulfur was stirred at 130–135° C. for 2.5 hours. Workup as in Example I gave 8.3 g. sulfurized p-toluic acid that melted at 220–250° C. (from 50% aqueous alcohol) and analyzed 56.0% C, 3.6% H, 21.8% S, and 224 acid number.

EXAMPLE XI

A mixture of 13.6 g. (0.1 mole) o-toluic acid, 50 ml. concentrated sulfuric acid, and 12.8 g. (0.4 gram atom) sulfur was stirred at 140° C. for 2.5 hours. Workup as in Example I gave 7.2 g. dark, sulfurized o-toluic acid that analyzed 46.5% C, 2.4% H, 26.9% S, and 269 acid number.

EXAMPLE XII

A mixture of 17.2 (0.1 mole) 2-naphthoic acid, 50 ml. concentrated sulfuric acid, and 12.8 g. (0.4 gram atom) sulfur was stirred at 130–135° C. for 1 hour. Workup as in Example I gave 15 g. sulfurized 2- naphthoic acid that analyzed 41.5% C, 2.7% H, 20.7% S, and 243 acid number.

EXAMPLE XIII

A mixture of 10.8 g. (0.05 mole) naphthalene-2,3-dicarboxylic acid, 50 ml. concentrated sulfuric acid, and 6.4 g. (0.2 gram atom) sulfur was stirred at 160° C. for 3 hours. Workup as in Example I gave 10.4 grams dark sulfurized naphthalene-2,3-dicarboxylic acid that analyzed 47.1% C, 2.6% H, 14.9% S, and 371 acid number.

EXAMPLE XIV

Long-chain amine salts were prepared from the sulfurized benzoic acid of Example I and the sulfurized p-chlorobenzoic acid of Example 5 by heating the same amines and acids together at 80–100° C. till clear liquids resulted. The table shows the amounts of amine and acid used and the elemental analyses of the products. The amines were Armour's Armeen 18 D, (n-octadecylamine), Armour's Armeen DMCD (dimethyl n-laurylamine), and General Mills Alamine 11 D (oleylamine).

| Example | Acid, g. | Amine, g. | Elemental analysis of amine salt | | |
|---|---|---|---|---|---|
| | | | Percent N | Percent S | Percent Cl |
| A | 1 | 3.04 | Armeen 18 D, 5.4 | 3.0 | 9.1 | |
| B | 1 | 3.04 | Armeen DMCD, 4.3 | 3.4 | 10.7 | |
| C | 1 | 3.04 | Alamine 11 D, 5.34 | 3.0 | 9.4 | |
| D | 5 | 3.73 | Armeen 18 D, 5.4 | 2.8 | 8.3 | 6.8 |
| E | 5 | 3.73 | Armeen DMCD, 4.3 | 3.2 | 9.7 | 7.6 |
| F | 5 | 3.73 | Alamine 11 D, 5.34 | 2.8 | 8.3 | 6.3 |

These salts were tested as extreme pressure additives in solvent-extracted 5 weight oil on the Almen extreme pressure machine, with these results:

| Salt | Concentration in 5W oil, wt. percent | Almen test, lbs. | |
|---|---|---|---|
| | | Pass | Fail |
| A | 0.5 | 30+ | |
| | 0.2 | 10 | 12 |
| B | 0.5 | 30+ | |
| | 0.2 | 8 | 10 |
| C | 0.5 | 30+ | |
| | 0.2 | 8 | 10 |
| D | 0.5 | 30+ | |
| | 0.2 | 30+ | |
| | 0.1 | 30+ | |
| | 0.05 | 28 | 30 |
| E | 0.5 | 30+ | |
| | 0.2 | 30+ | |
| | 0.1 | 30+ | |
| | 0.05 | 6 | 8 |
| F | 0.5 | 30+ | |
| | 0.2 | 20 | 26 |
| None | | 6 | 8 |

The Armeen 18 D salt of the acid of Example I was tested as an anti-rust in the ASTM rust test in synthetic sea water, and gave 0 rusting at 0.1 and 0.05% by weight.

What is claimed is:

1. A process for preparing sulfurized aromatic compounds, which process comprises reacting aromatic carboxylic acids having a nuclear carbon content from about 6 to about 10 carbon atoms in the ratio of 1 mole aromatic carboxylic acid:1 gram atom sulfur:one mole sulfuric acid to 1 mole aromatic carboxylic acid:20 grams atom sulfur: 50 moles sulfuric acid at a reaction temperature of about 100–200° C. for a reaction time of 0.2 to 24 hours.

2. A process of claim 1 wherein the reaction temperature is 130–185° C. the reaction time is 0.5 to 4 hours and where the ratio of the aromatic carboxylic acid having a nuclear carbon content from about 6 to about 10 carbon atoms to sulfur and sulfuric acid is one mole aromatic carboxylic acid:2 grams atom sulfur:4 moles sulfuric acid to one mole aromatic carboxylic acid:4 grams atom sulfur:10 moles sulfuric acid.

3. A process of claim 1 wherein the aromatic carboxylic acid is benzoic acid.

4. A process of claim 1 wherein the aromatic carboxylic acid is p-chlorobenzoic acid.

5. A process of claim 1 wherein the aromatic carboxylic acid is p-bromobenzoic acid.

6. A process of claim 1 wherein the aromatic carboxylic acid is p-fluorobenzoic acid.

7. A process of claim 1 wherein the aromatic carboxylic acid is m-chlorobenzoic acid.

8. A process of claim 1 wherein the aromatic acid is 2,4-dichlorobenzoic acid.

9. A process of claim 1 wherein the aromatic carboxylic acid is p-toluic acid.

10. A process of claim 1 wherein the aromatic carboxylic acid is naphthalene 2,3-dicarboxylic acid.

References Cited

UNITED STATES PATENTS 3,385,863  5/1968  Wick _____ 260—309.2
2,503,251  4/1950  Edwards _____ 18—54

OTHER REFERENCES

Hart & McClelland: J. Chem. Society, 1938, pp. 2114–2117.

LORRAINE A. WEINBERGER, Primary Examiner

E. J. GLEIMAN, Assistant Examiner

U.S. Cl. X.R.

260—470, 501.1

UNITED STATES PATENT OFFICE
CERTIFICATE OF CORRECTION

Patent No. 3,514,480                Dated May 26, 1970

Inventor(s) Ellis K. Fields

It is certified that error appears in the above-identified patent and that said Letters Patent are hereby corrected as shown below:

Column 2, line 35, "for" should read -- to form --.
Column 3, line 38, "are formed" should read -- were formed --.
Column 4, line 52, "17.2" should read -- 17.2 g --. Column 5, line 44, "200° C." should read -- 220° C. --.

Signed and sealed this 26th day of January 1971.

(SEAL)
Attest:

EDWARD M. FLETCHER, JR.            WILLIAM E. SCHUYLER, JR.
Attesting Officer                  Commissioner of Patents